Aug. 7, 1934.  A. J. PENOTE  1,969,522
UNIVERSAL BALANCED GRADE INDICATOR
Original Filed Dec. 5, 1928    2 Sheets-Sheet 1
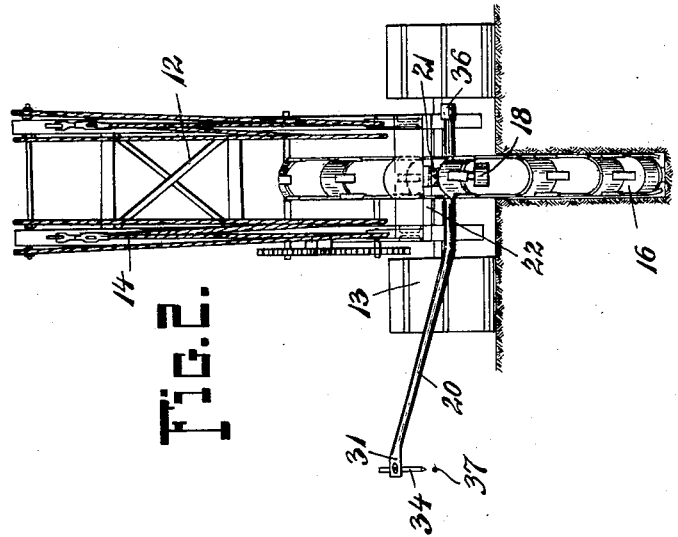
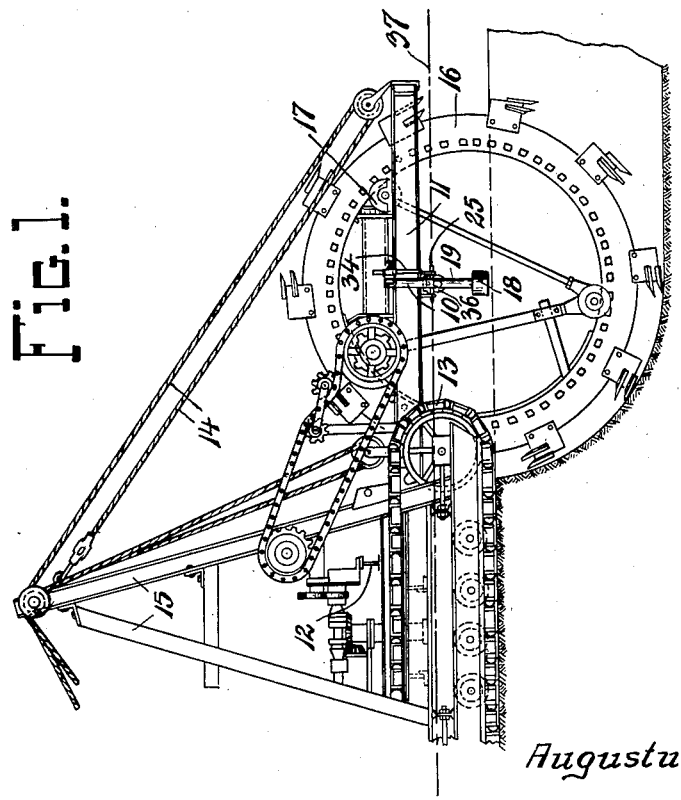
Inventor
Augustus J. Penote.
By Frank D. Gray
Attorney

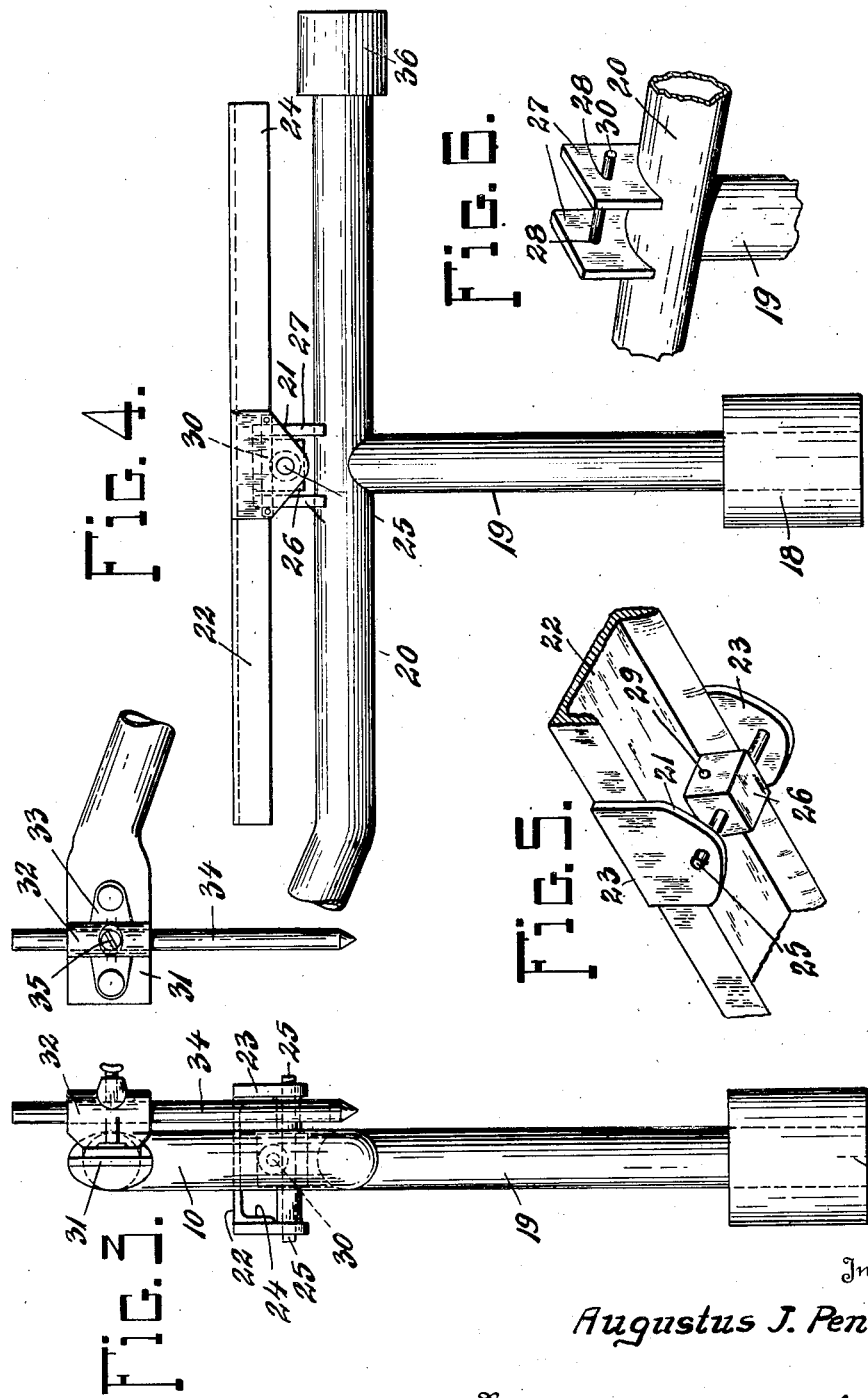

Patented Aug. 7, 1934

1,969,522

UNITED STATES PATENT OFFICE 1,969,522

UNIVERSAL BALANCED GRADE INDICATOR

Augustus J. Penote, Shaker Heights, Ohio

Application December 5, 1928, Serial No. 323,959
Renewed December 30, 1933

8 Claims. (Cl. 33—185)

My invention relates to universal balanced grade indicators designed to be mounted upon excavators in general, but more particularly to those provided for attachment to mechanism for digging trenches, to indicate to the operative seated upon the moving machine, the variation in level over which the machine is moving. By apprising the operative of such condition, my invention will enable the operative to manipulate the machine to maintain a substantially uniform depth of trench that is being excavated. Since my improved grade indicator embodies therein a universal joint, later to be more fully explained, such indicator serves to apprise the user of variations in transverse ground levels, as well as such variations in the direction in which the machine is moving. Attempts have heretofore been made to indicate needed adjustments of the trenching machine in such direction of movement, but the provision of a universal indicator, to indicate needed transverse adjustments as well as adjustments in the direction of travel of the machine, is to my knowledge, novel and unattempted.

My indicator will ordinarily be attached to the boom of an excavating machine, and will embody an arm transverse of the trench and will carry at the extreme outer end of the arm, a pointer or indicating element whose relation to the grade line before established, may be readily seen by the operator of the machine. This transverse arm will be suspended from the boom by a universal joint which causes the instrument to operate as a universal balanced indicator, sensitive to changes in the ground level in various planes, transverse of the trench as well as lengthwise thereof.

The instrument is illustrated as being mounted upon an excavating wheel, but may be used equally well upon an endless chain excavator, the instrument being suspended from the boom in either case. The object of my grade indicator is to warn the operator of the machine what adjustments of the boom are necessary to maintain a substantially uniform depth of trench.

It is a further object to provide certain details of construction and means of attachment tending to increase the general efficiency and adaptability of a universal balanced grade indicator to power-driven trench excavators.

For attaining these and other useful functions, my invention consists in various structures and combinations hereinafter described, set forth in the appended claims, and illustrated in the accompanying drawings, in which—

Figure 1 is a side elevation of a universal grade indicator mounted upon the boom of a trench machine, and showing only the rear portion of the latter;

Figure 2 is a rear elevation of such machine;

Figure 3 is a side elevation of the instrument detached from any machine;

Figure 4 is a rear elevation of the instrument, a section of the transverse arm being broken away, and Figures 5 and 6 are details in perspective of the universal joint and related parts.

The indicator 10 is illustrated as mounted upon the adjustable boom 11 pivoted at the rear end of a frame 12 carried by the caterpillar tractors 13, the boom being adjusted by the cables 14 supported by the masts 15. The excavating wheel 16 is supported by the boom upon the bearings 17. Evidently inclination of the ground level in a plane transverse of the trench, will incline the wheel 16 correspondingly, and vary the depth of the trench unless the boom 11 is adjusted correspondingly. Such adjustment and the need therefor will be indicated by my universal indicator 10 which embodies a weight 18 carried by the stem 19 secured to a cross arm 20, which latter is suspended from the stationary cross bar 22 by the universal joint 21.

The cross member 22 is usually a rigid angle bar mounted upon and transverse of the boom 11 and having depending ears 23 mounted upon the outer surfaces of the flanges 24 of said cross bar, the said ears having alined apertures in their lower ends to receive therein pivot pins 25 mounted oppositely upon a rocking block 26 to permit swinging of the block in a plane transverse to the plane of swing of the boom 11. The suspended cross arm 20 is provided with parallel, spaced and apertured lugs 27 fixedly secured thereto and extending upwardly therefrom so that their apertures 28 will be in alinement, and sufficiently spaced to receive the block 26 therebetween. The block 26 is further provided with a transverse opening 29 to receive therein a pivot pin 30 which is also intended to be threaded through the apertures 28 in the lugs 27.

The block 26 has therefore, the two pivotal axes 25 and 30 at right angles to each other, so that the weighted arm 19 fixed to and suspended from the cross arm 20 may swing in intersecting planes, and various planes oblique to either of these. This construction therefore, affords a "universal" joint for mounting the indicator upon the machine, and provides a "balanced" indicator for warning the adjustment required to maintain a uniform trench level or such inclination thereof as may be desired. To provide an unobstructed view of a portion of the instrument indicating the position of the machine at a given time, the cross arm 20 is extended laterally, usually beyond the outline of the tractors, the extreme end being provided with a vertically flattened portion 31 bearing on one side thereof a detachable sleeve 32 having lateral ears 33 secured to the arm 20 by suitable means, and the vertical sleeve 32 holding therein an adjustable indicating pin 34 secured therein by a screw member 35. The position of the pin 34 will be adjusted vertically to accommodate the height of the grade line used. The opposite end of the arm 20 has a weight 36 to counter-balance the indicator end of the arm.

The operation of the indicator is as follows: The usual grade line 37 is strung in the direction desired for the trench and in accordance with the depth of the trench below said line parallel with the latter that is desired. The machine having been started, the swinging arm 20 will extend on the side of the trench in view of the operator, and the indicating pin 34 adjusted to follow approximately the direction and height of said grade line. The cross member 22 will usually be fixedly mounted upon the boom 11 and extending through the wheel 16, the swinging block 26 having been mounted pivotally between the flanges 24 and upon the depending ears 23, so that the block 26 can swing in a plane transverse of the boom. The weight 18 together with its stem 19 and arm 20 is connected with this block by the pin 30 entering the openings 28 and 29.

My improved indicator is mounted upon the machine by securing the rigid member 22 to the boom 11. The said member normally carries the swinging block 26 pivoted upon the ears 23 by means of the pins 25. The cross arm 20 carrying with it the lugs 27 and the weight 18, may therefore be readily detached from the block 26 by the removal of the pin 30, when the indicator arm 20 for any reason, is not needed. In mounting the indicator therefore, the lugs 27 are attached to the block 26 as before explained.

The pivots 25 and 30 at right angles to each other, therefore provide a universal joint indicating by the position of the pin 34, the position of the excavating mechanism, though varied by uneven ground levels laterally or in the direction of travel of the machine. Any suitable means for raising or lowering the boom 11 and the excavating mechanism carried thereby, may be employed, such as the cables 14 and masts 15 illustrated in this case.

Any suitable means may be employed to determine a grade line either tangible or imaginary, with which the operator may compare the position of the pin 34. My invention is not limited to any particular means for this purpose.

Having thus described my invention, what I desire to claim and protect by Letters Patent of the United States is:

1. A balanced grade indicator for a trench digging machine having a vertically adjustable boom, comprising a cross bar fixedly mounted transversely of said boom and having spaced and downwardly-extending parallel ears, a cross arm having a vertically adjustable indicating pin secured to the end of the arm farthest from said boom and a counter-balance weight secured to the opposite end, and means including a universal joint between said ears, for pivoting the said cross arm in suspended relation from said cross bar.

2. A balanced grade indicator for a trench digging machine, comprising a weight-controlled cross arm having a vertically positioned indicating pin adjustably secured to one end thereof, a cross bar fixedly mounted upon a movable part of the machine and having spaced downwardly-extending flanges integral with said bar, and means including a universal joint mechanism between said flanges for pivotally suspending the said cross arm from said flanges.

3. A balanced grade indicator for a trench digging machine, comprising a cross arm having an indicating pin secured at one end thereof, a weight fixedly suspended from the arm intermediate its ends and fixed apertured lugs mounted in spaced relation upon said arm above the weight, a cross bar having parallel lateral flanges, said bar being mounted upon a movable part of the machine and transverse thereto, and means for pivotally suspending the arm from said flanges, said means including an intermediate member having alined pins engaging the flanges at right angles thereto, and a pin parallel to the arm mounted on said lugs.

4. A balanced grade indicator for a trench digging machine having a movable frame part, a cross bar fixedly secured to and transverse of said frame part to move with the latter, the said bar having downwardly-extending and parallel ears, a cross arm pivotally mounted beneath and parallel to the bar and having a vertically positioned indicating pin secured to one end of the arm and a weight secured to the opposite end, and means including a universal joint positioned between the said ears, for pivotally suspending the arm from said bar.

5. A balanced grade indicator for a trench digging machine embodying a boom pivoted to the machine in a plane in the length thereof, comprising a cross bar mounted upon said boom, a counter-balanced cross arm carrying an indicating pin on one end thereof, said arm being pivotally mounted beneath said bar and parallel thereto, parallel ears downwardly-extending from said cross bar in spaced relation, upwardly-extending spaced lugs fixedly secured to said cross arm intermediate its ends, and means for said pivotal mounting including a swinging block pivoted to said ears and therebetween by pins at right angles thereto and at an angle to the bar, and to said lugs by a pin penetrating the lugs and block at right angles to the aforesaid pins.

6. A balanced grade indicator for a trench digging machine, comprising a cross bar mounted upon a movable part of the machine, a cross arm having an indicating pin on one end thereof, a counterbalance weight on the opposite end and a weight fixedly-secured to and suspended from said arm intermediate its ends, fixed and apertured lugs mounted in spaced relation upon said arm above the suspended weight, parallel ears downwardly-extending from said cross bar, and means for pivotally suspending the cross arm from said downwardly-extending ears including a swinging block pivoted to said ears by pins at right angles thereto, and to the lugs on the arm by a pin at right angles to the aforesaid pins.

7. A balanced grade indicator for a trench digging machine embodying a boom pivoted to the machine in a plane in the length thereof, comprising a cross bar secured to said boom transversely thereof, a counterbalanced cross-arm having a laterally extending end bearing a vertically-positioned pin-holding sleeve said cross arm being pivotally mounted beneath said bar and parallel thereto, and means including a universal joint for said pivotal mounting whereby transverse tipping of the machine as well as pivoting of said boom will not vary the level of the said sleeve.

8. A balanced grade indicator for a trench digging machine having a movable frame part thereon, an elongated and laterally flanged cross bar transversely and fixedly mounted on said frame part, a cross arm mounted beneath and parallel to said bar and having a vertically-positioned indicating pin secured on one end thereof and a weight secured to the opposite end, and means including a universal joint between the flanges of the bar for pivotally suspending the arm from and beneath the bar.

AUGUSTUS J. PENOTE.